United States Patent [19]
Gorman et al.

[11] Patent Number: 5,908,098
[45] Date of Patent: Jun. 1, 1999

[54] REGULATING VALVE FOR ENGAGEMENT CONTROL OF FRICTION DRIVE DEVICES

[75] Inventors: Michael Joseph Gorman; Shushan Bai, both of Ann Arbor, Mich.

[73] Assignee: General Motors Corporation, Detroit, Mich.

[21] Appl. No.: 08/990,009

[22] Filed: Dec. 12, 1997

[51] Int. Cl.⁶ .................................................. F16D 25/12
[52] U.S. Cl. ................................. 192/109 F; 137/625.64
[58] Field of Search .................. 137/625.64; 192/109 F, 192/85 R

[56] References Cited

U.S. PATENT DOCUMENTS

| | | | |
|---|---|---|---|
| 3,601,148 | 8/1971 | Jeffrey et al. ........................... | 137/484.8 |
| 3,935,793 | 2/1976 | Murakami ............................ | 192/109 F |
| 5,119,697 | 6/1992 | Vukovich et al. ................... | 192/109 F |

*Primary Examiner*—Rodney H. Bonck
*Assistant Examiner*—Tisha D. Waddell
*Attorney, Agent, or Firm*—Donald F. Scherer; Michael J. Bridges

[57] ABSTRACT

A clutch engagement control has a flow regulating valve to control the engagement timing of the clutch. The regulating valve responds to a flow signal to reduce the fluid flow rate through the valve after the clutch apply piston has taken up the clutch free running clearance. The regulating valve has a control area communicating with a venturi between the regulating valve and the apply piston such that a flow rate signal is present at the control area.

1 Claim, 1 Drawing Sheet

REGULATING VALVE FOR ENGAGEMENT CONTROL OF FRICTION DRIVE DEVICES

TECHNICAL FIELD

This invention relates to engagement control valves for fluid operated friction devices.

BACKGROUND OF THE INVENTION

Automatic shifting transmissions use fluid operated friction devices, such as clutches and brakes, to establish gear ratios between the vehicle engine and drive wheels. The gear ratios are interchanged (upshifted or downshifted) to extend the usefulness of the engine operating range. During a ratio interchange, it is necessary to control the engagement timing of the on-coming friction device as well as controlling the disengagement point of the off-going friction drive device.

Fluid operated disc type friction devices have a free running clearance. That is, when a device is disengaged, the adjacent plates do not have significant contact to thereby maintain the slip losses of the device at a minimum. Free running clearance affects the engagement timing of the device. The apply piston must be pressurized to move through a distance defined by the free running clearance prior to clutch engagement. The movement should occur as quickly as possible. Thus, a large flow volume is originally required during the engagement process. The flow volume must be rapidly reduced to avoid a harsh apply of the friction device which will affect the ratio interchange.

Engagement timing is generally provided in current transmissions using one of three control methods depending upon the acceptable cost for the transmission. One control system incorporates one-way devices in combination with friction devices. These systems require duplicate arrangements if engine coast braking is to be available. However, the ratio change on and off of one-way devices is known to be quite smooth.

A second of the control systems uses variable pressure control devices, such as pulse-width-modulated valves to control the on-coming and off-going friction devices. These pulse-width-modulated devices require an electronic control module or computer to affect proper control of the variable pressure devices.

The third system uses a fluid accumulator and valve to control the on-coming friction device and a bleed orifice to control the off-going device. The accumulator requires additional space within the transmission housing as well as a valve mechanism that permits the accumulator to be filled when the friction device is engaging and to not interfere with the exhausting of the friction device during disengagement.

SUMMARY OF THE INVENTION

It is an object of the present invention to provide an improved pressure regulator valve for a friction device and engagement system.

In one aspect of the invention, a venturi is disposed in fluid flow relation between a regulator valve and the piston apply chamber of a fluid operated friction torque transmitting device.

In another aspect of the invention, the venturi permits fast initial filling of the piston apply chamber.

In yet another aspect of the invention, the pressure at the venturi provides a regulating or control pressure at the regulator valve.

In a further aspect of the invention, the regulator valve reduces fluid flow to the torque transmitting device as the apply pressure increases.

DESCRIPTION OF AN EXEMPLARY EMBODIMENT

Figure 1:
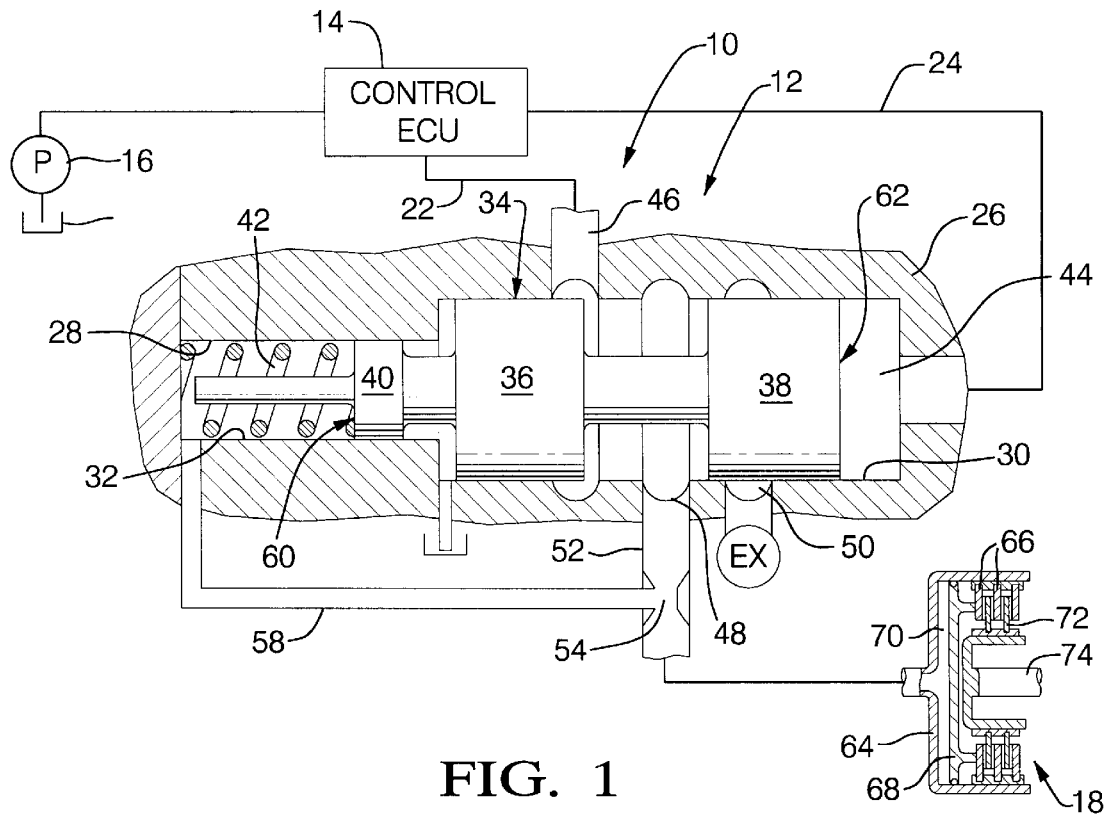
FIG. 1 is a diagrammatic view of a hydraulic system incorporating the present invention with a regulating valve shown in the engaging position.
Figure 2:
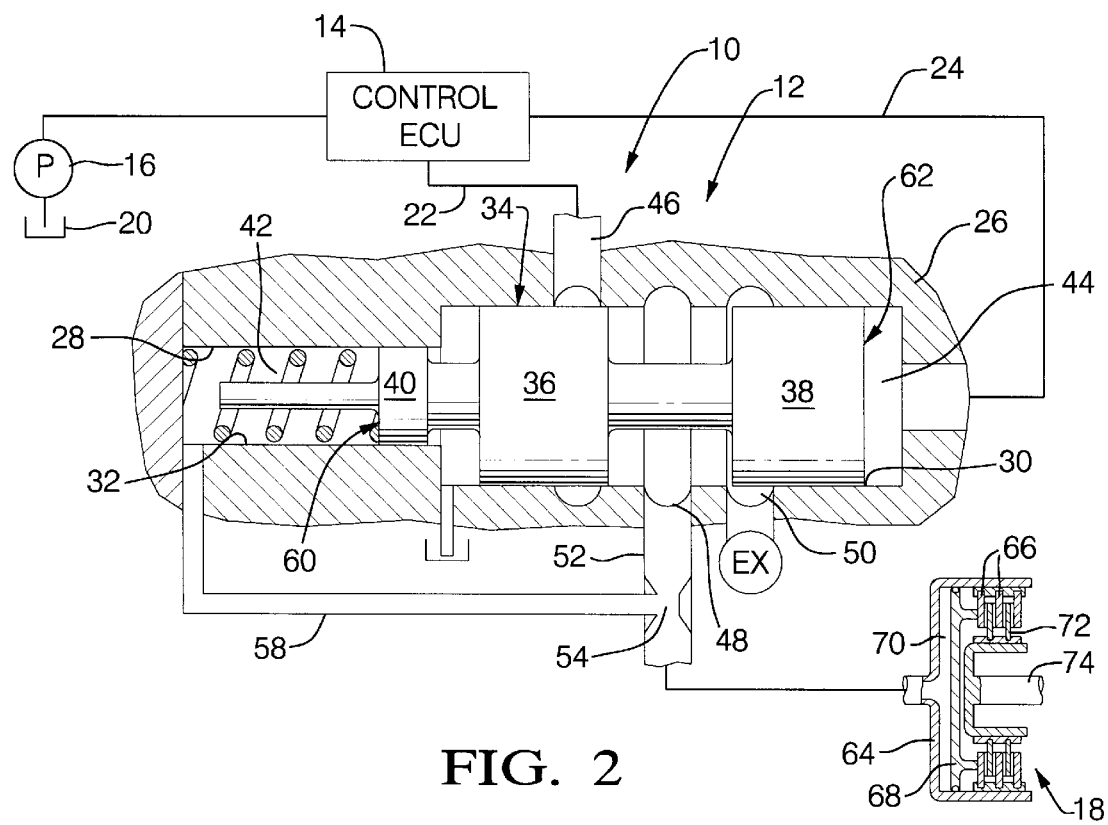
FIG. 2 is a diagrammatic view of a hydraulic system incorporating the present invention with a regulating valve shown in the disengaging position.

Referring to the drawings, wherein like characters represent the same or corresponding parts throughout the several views, there is seen in FIGS. 1 and 2 a hydraulic engagement control system 10 incorporating a flow regulating valve 12, an electro-hydraulic control or ECU 14, a hydraulic pump 16 and a fluid operated torque transmitting device 18 which is shown in the form of a clutch.

The pump 16 draws fluid from a reservoir 20 for distribution through the electro-hydraulic control system to various transmission components including the regulating valve 12. The ECU 14 includes a clutch feed passage 22 and a control passage 24, both of which communicate with the valve 12. The valve 12 includes a valve body 26 in which is formed a stepped valve bore 28 having a large diameter portion 30 and a small diameter portion A valve spool 34 has a pair of equal diameter spaced lands 36 and 38 slidably disposed in the bore 30 and a smaller diameter land 40 slidably disposed in the bore 32. The land 40 and bore 32 cooperate to form a control chamber which is also available to house a bypass spring 42. The valve land 38 and the diameter 30 cooperate to form a control chamber 44 which is disposed for fluid communication with the control passage 24.

The bore 30 has communicating therewith an inlet port 46, an outlet port 48 and an exhaust port 50. The inlet port 46 is connected with the feed passage 22 and the outlet port 48 is connected with an engage passage 52 which incorporates a venturi 54 and supplies fluid to a rotating clutch 18.

The venturi 54 has a flow rate control passage 58 communicating therewith which directs fluid to and from the control chamber 32. Fluid pressure in the control chamber 32 acts on a control area 60 which is represented by the left end of the land 40 and cooperates with the spring 42 to urge the valve spool 34 rightward, as seen in FIGS. 1 and 2. The valve land 38 has a control area 62 defined by the right end of the valve land 38 which is acted upon by fluid pressure in the control chamber 44 to urge the valve spool 34 leftward, as seen in FIGS. 1 and 2.

The clutch 18 is a conventional fluid operated friction device having a housing 64 to which is splined a plurality of friction discs 66. The housing 64 supports a piston 68 and cooperates therewith to provide an apply chamber 70. The clutch 18 also has a plurality of friction discs 72 which are drivingly connected with a shaft 74 which represents an output member of the clutch 18. The housing 64 is the input portion of the clutch and is generally connected to either a torque converter or an engine for supplying power from the power source or engine to the rear wheels of a vehicle, not shown.

As seen in FIG. 1, the ECU 14 has supplied fluid pressure through the control passage 24 to request the engagement of the clutch 18 which is presumably requiring an upshift ratio change within the transmission. The fluid in the control passage 24, and therefore control chamber 44, urges the valve spool 34 leftward to the positions shown, such that fluid flow in passage 22 is directed between the lands 36 and 38 to the outlet port 48 and therefore passage 52 in which it passes through the venturi 54 to the supply chamber 70 of the clutch 18.

Prior to engagement, the clutch 18 has a free running clearance such that the friction discs 66 and friction disc 72 are not in frictional engagement and therefore some movement of the piston is required within the supply chamber 70 before the frictional engagement can occur. This is known as the free running clearance and the initial movement of the piston 68 takes up this free running clearance. During this time, the pressure within the apply chamber is at a low level and fluid flow through the feed passage 22 and engage passage 52 is at a very high rate.

As understood by Bernoulli's theorem, the pressure at the throat of the venturi 54 will reduce as velocity increases, such that the fluid pressure in passage 58 will be quite low. Thus, the balance forces on the valve spool 34 permit the leftward movement of the valve spool 34 to open the fluid flow to the clutch 18. However, when the piston 68 begins to compress the friction discs 66 and 72 together, the pressure in the apply chamber 70 will rise quite rapidly and the piston 68 will be slowed considerably in its axial movement resulting in less fluid flow velocity through the venturi 54. Thus, the pressure in the control passage 58 will rise. The increased pressure in the control chamber 32 and the spring 42 will be sufficient to balance the fluid pressure in the control chamber 44 operating on the land 38. When this occurs, the valve spool 34 will move rightward to regulate the fluid flow through the regulating valve 12 thereby permitting a controlled engagement rate of the clutch 18.

During the clutch engagement, the pressure in control passage 24 will be maintained such that the clutch 18 will have full pressure imposed thereon to maintain the frictional integrity and drive characteristics of the clutch.

When it is desired to disengage the clutch, the fluid pressure in passage 24 will be reduced by the ECU 14, such that the valve spool 34 will move rightward toward the position seen in FIG. 2, at which time a controlled exhausting of the clutch 18 will occur. Thus, the regulator valve 12 can control both the engagement timing of the clutch and the disengagement timing of the clutch.

From the above description, it should, at this point, be obvious to those skilled in the art that the single regulating valve 10 is effective to provide engagement timing control for a fluid operated torque transmitting friction device. While the system in the exemplary embodiment is disclosed as utilizing a rotating clutch as the torque transmitter, those skilled in the art will appreciate that disc type friction brakes will also benefit from the use of this control system.

We claim:

1. A pressure and flow regulating valve for controlling the engagement of a fluid operated torque transmitting device comprising:

a valve body having a valve bore formed therein;

a valve spool slidably disposed in said valve bore and cooperating therewith to provide a first control chamber for urging the valve spool in one direction, a second control chamber for urging said valve spool in an opposite direction, and a bias spring assisting said second control chamber;

a pressure source;

a feed passage communicating said pressure source with said valve bore;

a control passage communicating said pressure source with said first control chamber;

an outlet passage communicating fluid from said regulating valve to a fluid operated torque transmitting device;

a venturi disposed in said outlet passage intermediate said regulating valve and said torque transmitting device;

a control passage communicating said venturi with said second control chamber, said first control passage communicating fluid pressure to said first control chamber to urge said valve spool to an open position whereby fluid pressure is distributed from said pressure source to said torque transmitting device, said pressure in said venturi being directed to said second control chamber to provide sufficient pressure therein to urge said valve spool to a flow reducing position when the fluid flow at said friction torque transmitting device is at or below a predetermined flow rate to thereby control the engagement time and force within the torque transmitting device.

\* \* \* \* \*